United States Patent
Nafie et al.

(10) Patent No.: US 6,931,051 B2
(45) Date of Patent: Aug. 16, 2005

(54) FREQUENCY HOPPING WIRELESS COMMUNICATION SYSTEM WITH FILTERED ADAPTIVE SLICER

(75) Inventors: Mohammed H. Nafie, Giza (EG); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 718 days.

(21) Appl. No.: 09/795,634

(22) Filed: Feb. 28, 2001

(65) Prior Publication Data

US 2001/0033601 A1 Oct. 25, 2001

Related U.S. Application Data

(60) Provisional application No. 60/186,005, filed on Mar. 1, 2000.

(51) Int. Cl.$^7$ ................................................ H04B 1/713
(52) U.S. Cl. ........................................ 375/136; 375/350
(58) Field of Search ........................ 370/324, 349–350, 370/491, 497, 509–514, 503; 375/285, 319, 325, 342, 344, 132, 136, 137, 144, 148, 272, 275, 278, 326, 334, 335, 340, 350, 232, 233; 329/300, 315, 318, 320; 455/205

(56) References Cited

U.S. PATENT DOCUMENTS

| | | | | |
|---|---|---|---|---|
| 4,813,058 A | * | 3/1989 | Takase ........................ | 375/328 |
| 5,412,687 A | * | 5/1995 | Sutton et al. ................ | 375/133 |
| 5,699,386 A | * | 12/1997 | Measor et al. .............. | 375/350 |
| 6,104,238 A | * | 8/2000 | Mattisson et al. .......... | 329/319 |
| 6,111,920 A | * | 8/2000 | Alelyunas et al. .......... | 375/326 |
| 6,130,921 A | * | 10/2000 | Powell et al. ............... | 375/344 |

\* cited by examiner

*Primary Examiner*—Tesfaldet Bocure
*Assistant Examiner*—Khanh Tran
(74) *Attorney, Agent, or Firm*—Ronald O. Neerings; Wade James Brady, III; Frederick J. Telecky, Jr.

(57) ABSTRACT

A wireless communication network comprising a wireless receiver. The wireless receiver comprises at least a first antenna for receiving packets, wherein each of the received packets comprises a plurality of bits and each of the plurality of bits is modulated by a frequency offset. The wireless receiver also comprises circuitry for cycling through a hopping sequence, wherein the hopping sequence comprises a sequence of frequency bands and circuitry for demodulating each received packet in response to a frequency band in the hopping sequence. The wireless receiver also comprises circuitry for detecting the frequency offset of each of the plurality of bits and converting the frequency offset of each of the plurality of bits into a corresponding DC voltage for each of the plurality of bits. Still further, the wireless receiver comprises circuitry for sampling the DC voltage for each of the plurality of bits and providing a DC offset voltage for each of the plurality of bits, and it also comprises circuitry for providing a filtered DC offset voltage by filtering the DC offset voltage. Lastly, the wireless receiver also comprises circuitry for providing a digital value corresponding to each of the plurality of bits in response to the corresponding DC voltage for each of the plurality of bits as adjusted in response to the filtered DC offset voltage.

25 Claims, 1 Drawing Sheet

FREQUENCY HOPPING WIRELESS COMMUNICATION SYSTEM WITH FILTERED ADAPTIVE SLICER

CROSS-REFERENCES TO RELATED APPLICATIONS

This application claims the benefit, under 35 U.S.C. § 119(e)(1), of U.S. Provisional Application No. 60/186,005, filed Mar. 1, 2000.

STATEMENT REGARDING FEDERALLY SPONSORED RESEARCH OR DEVELOPMENT

Not Applicable.

BACKGROUND OF THE INVENTION

The present embodiments relate to wireless communication systems and are more particularly directed to a wireless frequency hopping system with a receiver having a filtered adaptive slicer.

Wireless networks are becoming increasingly popular, and there has been improvement in many aspects of such networks. Various improvements relate to the use of a wireless network for a variety of devices that are typically within fairly close distances of one another, such as in the range of 10 meters or less. In the current state of the art, such a network is sometimes referred to as a personal area network ("PAN") and it may include, by way of example, a keyboard and a printer, each of which communicates in a wireless manner with a mutual computer that is also part of the PAN. Other wireless devices (e.g., personal organizers, cell phones, and still others) also may be implemented to communicate at either the PAN level or at much greater distances. In any event, the term network is used in this document to describe a system consisting of an organized group of any of various types of intercommunicating devices.

Devices within a wireless network may communicate using one of various different protocols or the like, where one currently popular approach is known in the art as spread spectrum frequency hopping and is sometimes referred to more simply as frequency hopping. In frequency hopping, a network transmitter transmits different packets of information at different frequencies such as in an effort to reduce the chance that the packets will interfere or "collide" with packets transmitted at different frequencies by a transmitter in a different network. The change between frequencies, that is, from one frequency to another, is said to be a "hop" between the frequencies. Thus, the transmitter has a corresponding frequency hopping sequence which specifies the various different frequency bands along which the transmissions are sent. The receiver likewise is informed of and operates in response to the frequency hopping sequence so as to properly receive and demodulate the transmissions. The goal of such an approach is that each packet from a first network is transmitted at a frequency which neither overlaps nor is near enough to a frequency at which a second network is transmitting. Further in this regard, some systems transmit each successive single packet, commonly referred to as a time slot and having a duration of 625 microseconds, at a different frequency; thus, the transmitter is "hopping" to a different frequency for each packet, where the so-called Bluetooth protocol is an example of such a system. Bluetooth is a fairly new standard for radio transmissions in the 2.4 GHz ISM (Industrial, Scientific, and Medical) band, and it uses frequency hopping across a certain number of carrier frequencies, where the number of total carrier frequencies is presently set by standards which differ in various geographies. Alternatively, others systems (e.g., IEEE 802.11) transmit a first set of multiple packets at a first frequency, and then hop to a second frequency to transmit a second set of multiple packets, and so forth for numerous different sets of packets at numerous different respective frequencies.

While frequency hopping has proven itself as a beneficial protocol in wireless networks, it also has certain limitations and drawbacks due to frequency variations in both the transmission and receipt of a packet. For example, for a packet communicated in a Bluetooth communication at a carrier frequency of 2.4 GHz, each bit in that packet represents either one of two binary values based on an additional change in a modulation frequency equal to ± a value which is commonly 160 kHz, but based on implementation this value of 160 kHz could be in a range of 140 to 175 kHz. For the sake of a consistent example, in this document the change in modulation frequency is assumed to be equal to 160 kHz. Thus, for a first binary value (e.g., 1), the bit is ideally modulated at a carrier frequency of 2.4 GHz+160 kHz, whereas for a second binary value (e.g., 0), the bit is ideally modulated at a frequency of 2.4 GHz−160 kHz. This change in frequency of ±160 kHz is sometimes referred to in the art as a frequency offset In any event, error in the transmitting station's clock can cause a variation up to ±75 kHz, and error in the receiver station's clock can cause a variation up to ±50 kHz. Thus, there is the potential of a total of ±125 kHz (i.e., ±75 kHz ±50 kHz) in frequency variation in a communication between the transmitter and receiver, which therefore is a considerably large value relative to the frequency offset of 160 kHz. Clearly, therefore, a technique must exist to reduce the effect of the frequency variation so as to properly demodulate the actual data encoded by the frequency offset of 160 kHz.

In a Bluetooth system, techniques are implemented to address the frequency variations described above and they typically are performed at the same time as synchronization. Specifically, after an initial synchronization between the Bluetooth master and slave, each receiver is configured to re-synchronize itself to a transmitter's clock at the beginning of receipt of each packet from that transmitter. More particularly, the transmitter inserts a channel access code ("CAC") at the beginning of each packet so that the receiver can use the CAC to re-synchronize itself to the transmitter's clock. The CAC consists of a preamble pattern (e.g., 1010 or 0101) followed by a 64-bit synchronization word. The receiver includes circuitry to thereby detect the CAC, which itself also introduces a ±10 bit uncertainty as to the exact location or occurrence of the CAC. As the CAC is being properly detected, the receiver also includes circuitry, as further detailed later, to correct for the frequency variations in both the transmission and receipt of the packet. Thus, once the receiver detects the CAC and also determines the frequency variation, the receiver is considered synchronized to the transmitter and can decipher the remaining data in the packet following the CAC by determining the frequency offset for each bit (i.e., either +160 KHz or −160 kHz), where this deciphering operation is assisted by the frequency variation determination made while the CAC was processed.

While the preceding approach has provided satisfactory synchronization results in frequency hopping wireless communication systems, it is observed in connection with the present inventive embodiments that such an approach also may be improved. Specifically and as also detailed later, the prior art includes a receiver for performing the synchronization and frequency variation detection functions, where the latter function is performed in part by an adaptive slicer circuit. The adaptive slicer circuit endeavors to reduce the effect of frequency variation in the received signal by determining a direct current ("DC") voltage offset adjustment to be made to the DC voltage which is derived from the received frequency modulated signal. However, the present inventors have observed that this approach is susceptible to error due to the presence of noise in the processed signal. Indeed, such noise results in an estimated 0.8 dB loss for the performance of the receiver's adaptive slicer as compared to an ideal slicer which would know the input DC offset exactly. Accordingly, there exists a need to improve upon this performance drawback, and this need is addressed by the preferred embodiments described below.

BRIEF SUMMARY OF THE INVENTION

In the preferred embodiment, there is a wireless communication network comprising a wireless receiver. The wireless receiver comprises at least a first antenna for receiving packets, wherein each of the received packets comprises a plurality of bits and each of the plurality of bits is modulated by a frequency offset. The wireless receiver also comprises circuitry for demodulating each received packet in response to a frequency band in a hopping sequence, wherein the hopping sequence comprises a sequence of frequency bands. The wireless receiver also comprises circuitry for detecting the frequency offset of each of the plurality of bits and converting the frequency offset of each of the plurality of bits into a corresponding DC voltage for each of the plurality of bits. Still further, the wireless receiver comprises circuitry for sampling the DC voltage for each of the plurality of bits and providing a DC offset voltage for each of the plurality of bits, and it also comprises circuitry for providing a filtered DC offset voltage by filtering the DC offset voltage. Lastly, the wireless receiver also comprises circuitry for providing a digital value corresponding to each of the plurality of bits in response to the corresponding DC voltage for each of the plurality of bits as adjusted in response to the filtered DC offset voltage. Other circuits, systems, and methods are also disclosed and claimed.

DETAILED DESCRIPTION OF THE INVENTION

Figure 1:
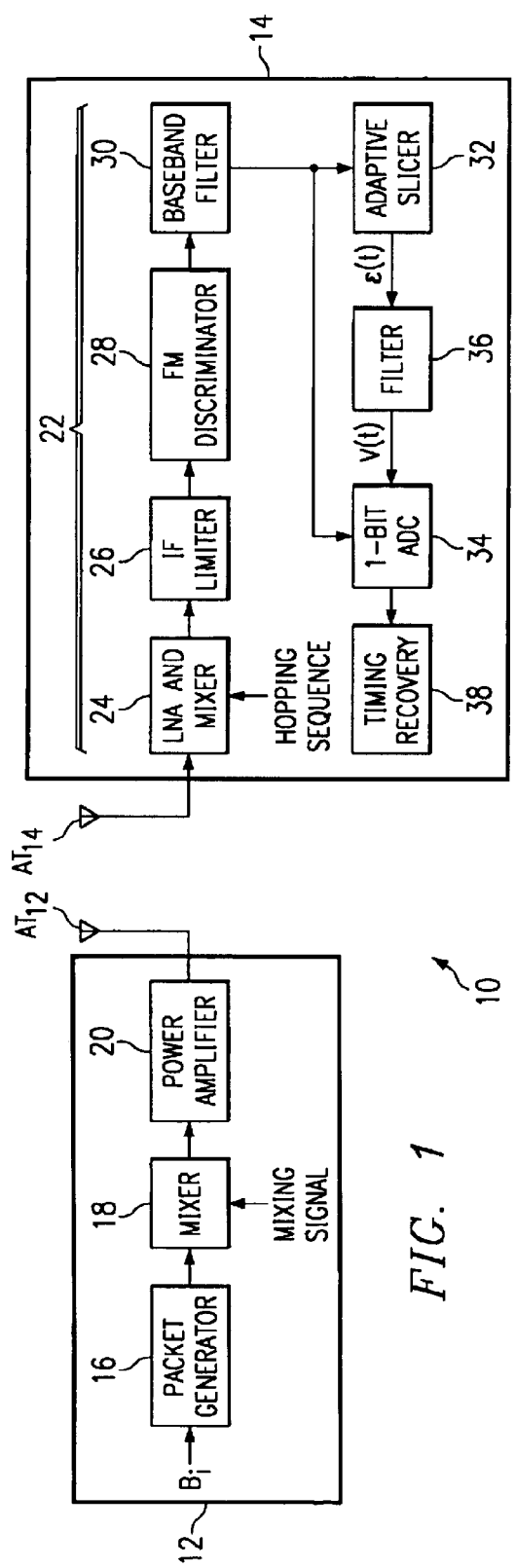
FIG. 1 illustrates a diagram of a wireless communications system by way of an example in which the preferred embodiments may be implemented.

FIG. 1 illustrates a wireless network 10 in which the network devices communicate with one another along a wireless medium using frequency hopping and as an example in which the preferred embodiments may be implemented. Network 10 preferably implements the Bluetooth protocol, which as known in the art defines a master/slave relationship between Bluetooth devices in a network. Network 10 includes two wireless communication devices 12 and 14 by way of example, where one skilled in the art will appreciate from the remaining discussion that numerous other devices may be included in the network. Each device 12 and 14 includes a respective antenna $AT_{12}$ and $AT_{14}$ for communication of frequency hopping packets between the devices. Devices 12 and 14 may represent various different wireless devices, such as voice communication devices in a cellular telephone system or computers and computer-peripherals in a personal area network ("PAN"). Also, in the preferred embodiment, communication devices 12 and 14 are preferably transceivers, while they alternatively could be only one of either a transmitter or a receiver. For the sake of example, assume that device 12 is a Bluetooth master while device 14 is a Bluetooth slave. Also to simplify the remaining illustration, it is assumed that device 12 is a transmitting device while device 14 is a receiving device; thus, for the remainder of this document, these devices are referred to as transmitter 12 and receiver 14, respectively. Lastly, note that either or both of transmitter 12 and receiver 14 may be residing in mobile devices, such as would be the case for a cellular phone or a transportable computing device or peripheral.

For purposes of operation, in general both transmitter 12 and receiver 14 include sufficient transceiver circuitry to communicate packets be wireless fashion and according to a frequency hopping protocol (e.g., Bluetooth). The term "packet" (and variations thereof) is used in this document as synonymous with a block of information sent in a finite period of time, where subsequent such packets are sent at other corresponding time periods. This block of information may take on various forms, and the block sometimes includes different information types such as a preamble or other type of control information, followed by user information which is sometimes also referred to as user data. Further, the overall packet may be referred to in the art by other names, such as a frame, and these other information blocks are also intended as included within the term "packet" for purposes of defining the present inventive scope. In any event, some of this circuitry is illustrated and discussed below to better appreciate the preferred embodiments. However, various other circuitry is known in the wireless art and, therefore, it is neither illustrated nor discussed in detail. For the sake of simplifying the discussion, each of transmitter 12 and receiver 14 is discussed separately below.

Transmitter 12 alone is constructed according to the prior art, but its operation in connection with receiver 14 improves the overall performance of network 10 as detailed later. Turning first to transmitter 12, it includes information bits $B_i$, which may be produced from various circuits (not shown), and bits $B_i$ are connected to an input of a packet generator 16. Packet generator 16 parses the bits into the appropriate groups and encodes the bits into a packet format, which thereby includes within that format a preamble as detailed earlier in the Background Of The Invention section of this document. Thus, packet generator 16 inserts the previously-described channel access code ("CAC") into the packet format and follows it with the appropriate data as provided by bits $B_i$.

The output of packet generator 16 is connected as an input to a mixer circuit 18. Mixer circuit 18 also receives a mixing signal as a second input. In the example of a Bluetooth network, the mixing signal is the 2.4 GHz carrier frequency plus any carrier frequency adjustment for the hopping band along which the packet is to be transmitted. In the example of Bluetooth communications, typically each hopping band is 1 MHz wide. Thus, the actual carrier frequency may be 2.402 GHz plus an additional integer times 1 MHz, where the integer is determined by the frequency hopping sequence such that the present band indicated by the sequence is added to the 2.402 GHz carrier frequency. Accordingly, the carrier frequency is 2.402GHz+S(1 MHz), where S represents the band along which the present packet is to be communicated.

Note that in Bluetooth the number of bands, S, are typically established by standards, such as a total of 79 bands in the United States and most of Europe (except Spain and France) or a total of 23 bands in Spain, France, and Japan. For the United States example, therefore, the mixing signal input to mixer circuit 18 will be between 2.402 GHz and 2.480 GHz (i.e., 2.402GHz+(79−1)(1MHz)=2.480 GHz In addition to the preceding, mixer circuit 18 also frequency modulates each bit within the packet according to the value of the bit, whereby if the bit is a logical low (e.g., binary 0) then the carrier frequency is decreased by 160 kHz, and if the bit is a logical high (e.g., binary 1) then the carrier frequency is increased by 160 kHz.

The output of mixer circuit 18 is connected as an input to a power amplifier 20. Power amplifier 20 increases the power applied to the signal to raise it to the appropriate level for wireless communication. Thus, after the amplification is applied in this regard, the packet is transmitted by transmitter 12 via its antenna $AT_{12}$. Accordingly, the packet and other like-transmitted packets may be received by a receiver, including receiver 14 as detailed below.

Receiver 14 receives radio frequency communications at its antenna $AT_{14}$ and those communications therefore include packets transmitted by transmitter12. These communications are connected to a frequency demodulator path designated generally at 22 and which includes four blocks known in the art: a low noise amplifier and mixer 24, an intermediate frequency ("IF") limiter 26, a frequency modulation ("FM") discriminator 28, and a baseband filter 30. Since these blocks are known in the art they are only briefly discussed here. Low noise amplifier and mixer 24 amplifies the input signal from antenna $AT_{14}$ due to the attenuation of that signal as it traveled in the wireless medium, and preferably amplifier and mixer 24 is constructed of sufficient circuitry so as to minimize the introduction of additional noise into the signal due to the amplification. In addition, low noise amplifier and mixer 24 receives the hopping sequence as an input and thereby removes that level of modulation from the incoming signal. The result is an amplified and intermediate frequency level output which is connected from amplifier 24 to IF limiter 26, and which in the preferred embodiment is on the order of 4 MHz plus the frequency offset (i.e., ±160 kHz). Since network 10 is a frequency modulation system, then signal amplitude is not critical insofar as representing data; thus, IF limiter 26 normalizes the amplitude of the signal so that the signal may be processed further. Also due to the lack of importance of amplitude in such a system, note that no automatic gain control ("AGC") circuitry is required in receiver 14. In any event, the amplitude-normalized signal is then connected to FM discriminator 28. FM discriminator 28 and baseband filter 30 together convert the frequency offset in the incoming signal into a corresponding DC voltage. More particularly, FM discriminator 28 performs a multiplication of the signal with a delay version of itself and the result thereby provides a baseband signal along with various harmonics; further, baseband filter 30 removes the harmonics, thereby leaving only the DC voltage corresponding to the frequency offset. Ideally, therefore, if the frequency offset is +160 kHz, then the output of baseband filter 30 is a first DC voltage representing a high binary signal, whereas if the if the frequency offset is −160 kHz, then the output of baseband filter 30 is a second DC voltage representing a low binary signal.

The preceding operation, particularly with respect to the output of baseband filter 30, describes an ideal output of one of two DC voltages. In actuality, however, the output of baseband filter 30 is further influenced by any variation in either the transmitter or receiver clock frequency which, as described above in the Background Of The Invention section of this document, may in fact exceed the frequency swing caused by the frequency offset. To compensate for these additional factors, the output of baseband filter 30 is connected as an input to an adaptive slicer 32, and it is also connected to a 1-bit analog-to-digtal converter ("ADC") 34, both of which are used in the prior art. However, in the preferred embodiment, adaptive slicer 32 works in a novel manner insofar as its signal is further processed by way of a filter 36 connected between adaptive slicer 32 and 1-bit ADC 34, thereby achieving improved performance as further detailed below.

Looking first to adaptive slicer 32 in the manner that it is the same as in the prior art, it preferably implements two capacitors, where a first capacitor stores a DC voltage, $V_H$, from baseband filter 30 corresponding to a high binary value while a second capacitor stores a DC voltage, $V_L$, from baseband filter 30 corresponding to a low binary value. In an ideal situation where there is no frequency variation and hence, no DC voltage contribution by such frequency error, then $V_H$ and $V_L$ are complementary voltages (i.e., symmetric about zero); thus, assume by way of example for an ideal case that $V_H$=1.0 volt while $V_L$=−1.0 volt. In response to the voltages stored on its two capacitors, adaptive slicer 32 determines a DC offset voltage. Thus, for a bit in a packet at a time instant t, let this DC offset voltage be represented as $\epsilon(t)$, and it is determined according to the following Equation 1:

$$\varepsilon(t) = \frac{V_H + V_L}{2} \qquad \text{Equation 1}$$

From Equation 1, therefore, in the ideal case where $V_H$ and $V_L$ are complementary voltages, then the DC offset equals 0 volts.

However, recall that frequency errors such as in the clock of transmitter 12 and receiver 14 may arise, and when these fluctuations are processed through frequency demodulator path 22, then the results from baseband filter 30 are DC voltages other than the ideal cases of $V_H$=1.0 volt and $V_L$=−1.0 volt. As a different example, therefore, assume that the frequency variations on average cause a higher frequency signal to be received than is ideal. As a result, $V_H$ and $V_L$ are increased, and by way of example assume that $V_H$=1.2 volt while $V_L$=−0.8 volt. By applying these values to Equation 1, then adaptive slicer 32 makes a different DC offset voltage determination as shown in the following Equation 2:

$$\varepsilon(t) = \frac{V_H + V_L}{2} = \frac{1.2 + (-0.8)}{2} = 0.2 \text{ volts} \qquad \text{Equation 2}$$

From Equation 2, under the prior art the 0.2 volt output from the prior art adaptive slicer is connected directly as an offset to a prior art analog-to-digital converter ("ADC"). In response, in the next time instant (i.e., t+τ), the ADC subtracts this offset value from the remaining voltage provided by baseband filter 30 and the result is converted by the ADC into a digital counterpart value. However, as discussed earlier in the Background Of The Invention section of this document, the present inventors have observed that the performance of such an approach may be improved, as is achieved in the preferred embodiment as further discussed below.

Adaptive slicer 32 operates as discussed above with respect to Equation 1, that is, to accumulate voltages on capacitors and determine an offset from the accumulated high and low voltages. Next, recall that the output of adaptive slicer 32 is not directly connected to an ADC as in the prior art but, instead, it is connected as an input to filter 36. In the preferred embodiment, filter 36 is a first order filter and has a structure which is now described further in connection with FIG. 2.

Figure 2:
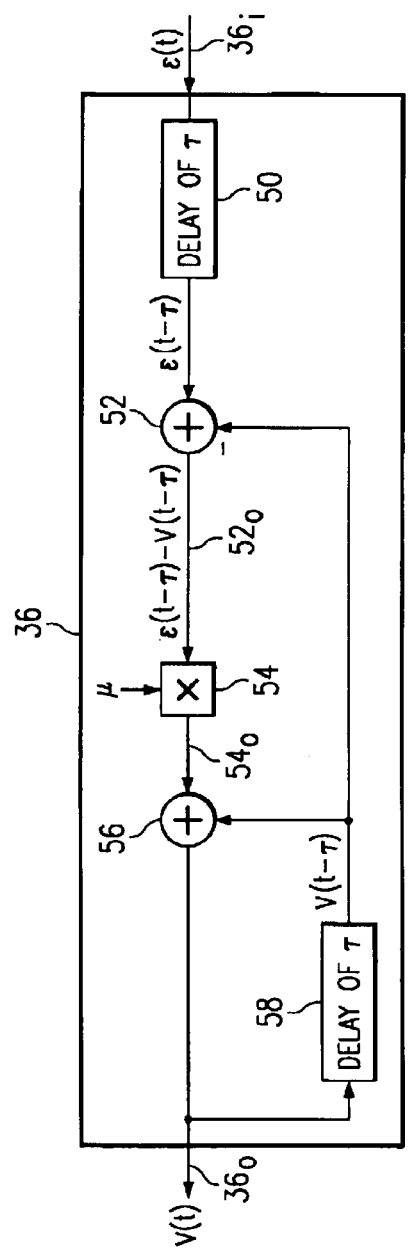
FIG. 2 illustrates a block diagram of the preferred embodiment filter used in connection with the adaptive slicer of the receiver in FIG. 1.

FIG. 2 illustrates a functional block diagram of the preferred embodiment for filter 36. Filter 36 has an input 36$_i$ connected to receive the output, $\epsilon(t)$, from adaptive slicer 32. Input 36$_i$ is connected to a one-sample delay element 50, and the output of delay element 50 is connected as an addend to an adder 52. The output of adder 52 is connected as a multiplicand input to a mulitplier 54. A second multiplicand input to mulitplier 54 is a filtering coefficient $\mu$, where preferably $0<\mu<1$ as detailed below. The output 54$_o$ of mulitplier 54 is connected as an addend input to an adder 56. The output of adder 56 provides the output signal, v(t), of filter 36 along an output 36$_o$. The output signal, v(t), is also fed back as an input to a one-sample delay element 58. The output of one-sample delay element 58 is connected as a second addend input to adder 56 and its negative value is also connected as a second addend input to adder 52.

The operation of filter 36 may be appreciated from the illustration of FIG. 2 and is further characterized by the following Equation 3:

$$v(t)=v(t-\tau)+\mu(\epsilon(t-\tau)-v(t-\tau)) \qquad \text{Equation 3}$$

Equation 3, as well as the operation of filter 36, may be confirmed by tracing the various signals through the illustration of FIG. 2, starting from the input 36$_i$ of filter 36. Thus, input 36$_i$ passes through one-sample delay element 50, which thereby produces an output which may be designated as $\epsilon(t-\tau)$ due to the delay by one sample. Also, since the output of delay element 58 delays the v(t) output by one sample, then it may be designated as $v(t-\tau)$ and the negative of this value, $-v(t-\tau)$, is added by adder 52 to the $\epsilon(t-\tau)$ output from one-sample delay element 50. Accordingly, the output 52$_o$ of adder 52 is as shown in the following Equation 4:

$$\text{output } 52_o=(\epsilon(t-\tau)-v(t-\tau)) \qquad \text{Equation 4}$$

Next, the output from Equation 4 is multiplied by multiplier 54 times the filtering coefficient, $\mu$; thus, the output 54$_o$ of multiplier 54 is as shown in the following Equation 5:

$$\text{output} 54_o=\mu(\epsilon(t-\tau)-v(t-\tau)) \qquad \text{Equation 5}$$

Finally, output 54$_o$ is added to the delayed output from delay element 58, thereby producing the total result for v(t) as shown above in Equation 3. Given the preceding, one skilled in the art should appreciate that the filtering operation of filter 36 operates to further attenuate the effects of any noise included in the $\epsilon(t)$ output from adaptive slicer 32 which is connected to filter 36, and this operation and its benefits are further explored below.

Returning to FIG. 1, the signal v(t) from filter 36 is output to 1-bit ADC 34 which recall also receives the DC voltage output from baseband filter 30. In response, ADC 34 subtracts v(t) as an offset from the voltage then being output by baseband filter 30, and then ADC 34 converts the result of this subtraction to a digital output value. Looking at these operations by way of example, recall the case as illustrated in Equation 2 above wherein $V_H$=1.2 volt and $V_L$=−0.8 volt. Thus, in a given time instance n, suppose that baseband filter 30 outputs $V_H$ (whereas as an alternative it could output $V_L$) to ADC 34 and to adaptive slicer 32. Also in the present example, adaptive slicer 32 in response determines a value on the order of $\epsilon(t)$=0.2, which is then connected to filter 36. Filter 36 then operates as illustrated above with respect to Equation 3, so that in the next instance of t (i.e., t+$\tau$) a filtered offset value v(t+$\tau$) is provided to ADC 34, and that offset is subtracted from the then-output value from baseband filter 30. As a result of these operations, the effect of noise present in the output $\epsilon(t)$ of adapter slicer 32 is reduced. Indeed, in the preferred embodiment and as further detailed below, an improvement on the order of 0.3 dB has been simulated as compared to a prior art approach wherein the output of the adaptive slicer is directly connected to an ADC. Recalling that the prior art gives rise to an approximate 0.8 dB loss as compared to an ideal slicer configuration, there is a 37.5 percent (i.e., 0.3/0.8) increase in performance as between the 0.8 dB prior art value and the 0.3 dB improvement by the preferred embodiment. In any event, once ADC 34 operates as described above, it outputs the converted digital value to a timing recovery correlator 38. Timing recovery correlator 38 operates according to the prior art, that is, it runs in the baseband and endeavors to identify where the signal is operating in time. Finally, note that the preceding operations are preferably performed by receiver 14 during receipt of the CAC at the beginning of a packet received by receiver 14. Thus, once the corrective values for that packet, including the offset from filter 36, are established in connection with the CAC bits of the packet, those values are preferably applied by receiver 14 to the remaining data (including user data) in that packet. In an alternative embodiment, the preceding process may be repeated later during the same packet to provide an updated DC offset voltage with that updated value then used with respect to subsequent bits in the packet. As still another alternative, the process could be continuous throughout the processing of the packet so that a continuously updated DC offset voltage is obtained and applied to packet bits then being processed. In any of these approaches, when a new packet is received, the preceding process repeats with respect to the CAC in that packet and so forth for subsequent communications.

Having illustrated in FIG. 2 a preferred embodiment of a filter 36 and having demonstrated how its operation achieves the functionality demonstrated by Equation 3, note that such an embodiment necessarily requires a value for the filtering coefficient $\mu$ to achieve its beneficial performance. As introduced earlier, recall that in the preferred embodiment that $0<\mu<1$. The actual value of $\mu$ in this range between zero and one may be established in various manners, such as through simulations and with empirical data. For example, in one embodiment, $\mu$ may be set to a single value between zero and one. As another example, however, in an alternative embodiment $\mu$ the filtering coefficient changes among a plurality of different values, each of which is between zero and one, and such that each different value is reduced for successive bits received in a single received packet. More particularly in this case, the following Table 1 illustrates receipt of a total of 184 bits, with three different values of $\mu$ are implemented by filter 36 as applied to three different respective sets of bits within those 184 bits:

TABLE 1

| μ | Bits |
|---|---|
| 0.004 | first 52 Bits |
| 0.001 | next 40 bits |
| 0.00025 | remaining bits in packet |

According to Table 1, it may be seen that for a first set of 52 bits in a packet a value of $\mu=0.004$ is used by filter 36, followed by a value of $\mu=0.001$ for a successive and second set of 40 bits, followed lastly by a value of $\mu=0.00025$ for a successive and third set of bits that complete the packet. Thus, in this alternative, note various attributes. First, the value of $\mu$ is initially at a given value as applied to a first set of bits and then is reduced for additional bits (i.e., in one or more additional sets of bits). Second, in the approach of Table 1, each reduction of $\mu$ represents a 25 percent reduction in the value of $\mu$ in comparison to the immediately-preceding value of $\mu$. Both of these attributes were found in combination to provide the 0.3 dB net gain for the filtered adaptive slicer output v(t) as mentioned above, and thereby show themselves to be desirable for implementing filter 36.

In addition to the preceding, note that the operation of network 10 in various respects may be in the manner of communications between frequency hopping wireless devices known to one skilled in the art. Since such operation is known it is not explored further herein. However, it is noted that the overall operation is further enhanced by implementing with such communications the methodology of the preferred embodiment as detailed above.

From the above, it may be appreciated that the preferred embodiments provide a wireless frequency hopping system including a transmitter and receiver, where network communications are improved. This improvement arises in that the receiver achieves better demodulation and synchronization performance over the prior art in connection with its adaptive slicing and analog-to-digital conversion values which arise in response to frequency variations such as from variations in the transmitter or receiver clock frequency. Moreover, the alternatives provided above demonstrate considerable flexibility in the inventive scope, and indeed still additional alternatives are contemplated. For example, while certain example values have been given for the value of $\mu$ those values may be adjusted given various additional considerations by one skilled in the art. As another example, while the preferred embodiments may be used with the Bluetooth protocol, other frequency hopping wireless protocols may implement various of the preceding teachings. Nonetheless, Bluetooth may well become a very prevalent protocol and, for this reason, the preferred embodiment specifically contemplates a Bluetooth implementation. As a final example, while filter 36 is shown to be a first order filter in one preferred embodiment, in an alternative embodiment filter 36 is a second order filter. Indeed, the first order approach is preferred when the frequency error is expected to be relatively constant which is often the case in a frequency hopping network, but nonetheless a second order filter would be more desirable for embodiments wherein there is a relatively quick drift or change in frequency errors. In any event, therefore, while the present embodiments have been described in detail, the preceding further demonstrates that various substitutions, modifications or alterations could be made to the descriptions set forth above without departing from the inventive scope which is defined by the following claims.

What is claimed is:

1. A wireless communication network, comprising:
    a wireless receiver, comprising:
    at least a first antenna for receiving packets;
    wherein each of the received packets comprises a plurality of bits; and
    wherein each of the plurality of bits is modulated by a frequency offset;
    circuitry for demodulating each received packet in response to a frequency band in a hopping sequence, wherein the hopping sequence comprises a sequence of frequency bands;
    circuitry for detecting the frequency offset of each of the plurality of bits and converting the frequency offset of each of the plurality of bits into a corresponding DC voltage for each of the plurality of bits;
    circuitry for sampling the DC voltage for each of the plurality of bits and providing a DC offset voltage for each of the plurality of bits;
    circuitry for providing a filtered DC offset voltage by filtering the DC offset voltage; and
    circuitry for providing a digital value corresponding to each of the plurality of bits in response to the corresponding DC voltage for each of the plurality of bits as adjusted in response to the filtered DC offset voltage.

2. The wireless communication network of claim 1:
    wherein the circuitry for providing a filtered DC offset voltage comprises a filter circuit having a filtering coefficient; and
    wherein the filtering coefficient is between zero and one.

3. The wireless communication network of claim 2 wherein the circuitry for providing a filtered DC offset voltage comprises a first order filter circuit.

4. The wireless communication network of claim 2 wherein the circuitry for providing a filtered DC offset voltage comprises a second order filter circuit.

5. The wireless communication network of claim 2 wherein the filtering coefficient changes among a plurality of different values for a corresponding plurality of different set of bits in a packet.

6. The wireless communication network of claim 5:
    wherein the circuitry for providing a filtered DC offset voltage provides the filtered DC offset voltage in response to preamble bits in a given packet; and
    wherein the circuitry for providing a digital value further provides a digital value corresponding to each of a plurality of data bits, following the preamble bits, in response to the corresponding DC voltage for each of the plurality of data bits as adjusted in response to the filtered DC offset voltage provided in response to preamble bits in the given packet.

7. The wireless communication network of claim 5 wherein the plurality of different values consists of three different values.

8. The wireless communication network of claim 7:
    wherein the circuitry for providing a filtered DC offset voltage provides the filtered DC offset voltage in response to preamble bits in a given packet; and
    wherein the circuitry for providing a digital value further provides a digital value corresponding to each of a plurality of data bits, following the preamble bits, in response to the corresponding DC voltage for each of the plurality of data bits as adjusted in response to the filtered DC offset voltage provided in response to preamble bits in the given packet.

9. The wireless communication network of claim 5 wherein each different filtering coefficient for a given packet is less than an immediately-preceding filtering coefficient for the given packet.

10. The wireless communication network of claim 9:
    wherein the circuitry for providing a filtered DC offset voltage provides the filtered DC offset voltage in response to preamble bits in a given packet; and
    wherein the circuitry for providing a digital value further provides a digital value corresponding to each of a plurality of data bits, following the preamble bits, in response to the corresponding DC voltage for each of the plurality of data bits as adjusted in response to the filtered DC offset voltage provided in response to preamble bits in the given packet.

11. The wireless communication network of claim 5 wherein each different filtering coefficient for a given packet is 25 percent less than an immediately-preceding filtering coefficient for the given packet.

12. The wireless communication network of claim 11:
    wherein the circuitry for providing a filtered DC offset voltage provides the filtered DC offset voltage in response to preamble bits in a given packet; and
    wherein the circuitry for providing a digital value further provides a digital value corresponding to each of a plurality of data bits, following the preamble bits, in response to the corresponding DC voltage for each of the plurality of data bits as adjusted in response to the filtered DC offset voltage provided in response to preamble bits in the given packet.

13. The wireless communication network of claim 1 and further comprising a wireless transmitter for transmitting packets to the receiver.

14. The wireless communication network of claim 1 wherein the packets comprise Bluetooth protocol packets.

15. The wireless communication network of claim 1:
    wherein the circuitry for providing a filtered DC offset voltage comprises a filter circuit having a filtering coefficient $\mu$, an input $\epsilon(t)$, and an output $v(t)$;
    wherein the filtering coefficient $\mu$ is between zero and one; and
    wherein the operation of the filter circuit is characterized by $$v(t)=v(t-\tau)+\mu(\epsilon(t-\tau)-v(t-\tau)).$$

16. A method of operating a wireless communication network, comprising the steps of:
    operating a wireless receiver, comprising the steps of:
    receiving packets along at least a first antenna;
    wherein each of the received packets comprises a plurality of bits; and
    wherein each of the plurality of bits is modulated by a frequency offset;
    demodulating each received packet in response to a frequency band in a hopping sequence,
    wherein the hopping sequence comprises a sequence of frequency bands;
    detecting the frequency offset of each of the plurality of bits and converting the frequency offset of each of the plurality of bits into a corresponding DC voltage for each of the plurality of bits;
    sampling the DC voltage for each of the plurality of bits and providing a DC offset voltage for each of the plurality of bits;
    providing a filtered DC offset voltage by filtering the DC offset voltage; and
    providing a digital value corresponding to each of the plurality of bits in response to the corresponding DC voltage for each of the plurality of bits as adjusted in response to the filtered DC offset voltage.

17. The method of claim 16:
    wherein the step of providing a filtered DC offset voltage comprises operating a filter circuit having a filtering coefficient; and
    wherein the filtering coefficient is between zero and one.

18. The method of claim 17 and further comprising changing the filtering coefficient among a plurality of different values for a corresponding plurality of different set of bits in a packet.

19. The method of claim 18:
    wherein the step of providing a filtered DC offset voltage provides the filtered DC offset voltage in response to preamble bits in a given packet; and
    wherein the step of providing a digital value further provides a digital value corresponding to each of a plurality of data bits, following the preamble bits, in response to the corresponding DC voltage for each of the plurality of data bits as adjusted in response to the filtered DC offset voltage provided in response to preamble bits in the given packet.

20. The method of claim 18 and further comprising changing the filtering coefficient among three different values for a corresponding plurality of different set of bits in a packet.

21. The method of claim 18 wherein the step of changing the filtering coefficient comprises reducing the filtering coefficient for different successive sets of bits in a packet.

22. The method of claim 18 wherein each different filtering coefficient for a given packet is 25 percent less than an immediately-preceding filtering coefficient for the given packet.

23. The method of claim 16 and further comprising transmitting packets to the receiver via a wireless transmitter.

24. The method of claim 16 wherein the packets comprise Bluetooth protocol packets.

25. The method of claim 16:
    wherein the step of providing a filtered DC offset voltage comprises operating a filter circuit having a filtering coefficient $\mu$, an input $\epsilon(t)$, and an output $v(t)$;
    wherein the filtering coefficient $\mu$ is between zero and one; and
    wherein the operation of the filter circuit is characterized by $$v(t)=v(t-\tau)+\mu(\epsilon(t-\tau)-v(t-\tau)).$$

* * * * *